Fig. 1.

Patented Mar. 6, 1945

2,370,672

UNITED STATES PATENT OFFICE 2,370,672

BEAMER

Fritz Lambach, Fairview, N. J.

Application November 21, 1941, Serial No. 419,833

17 Claims. (Cl. 172—179)

My invention relates to textile machines, and more particularly to a beamer or the like.

An object of my invention is to improve upon the construction of beamers or the like as now ordinarily made.

My invention consists in certain novel features of construction of my improvements as will be hereinafter fully described.

Further objects and advantages of the invention will be apparent from the following disclosure of an embodiment thereof.

In the accompanying drawings is:

Fig. 4 is a top plan view of the "Stop-Inch-Start-Station" shown in Fig. 3, and Fig. 5 a diagram of the wiring system for the electrical equipment of the beaming plant, wherein the switches are shown in their normal position when the relays are deenergized.

Figure 1:
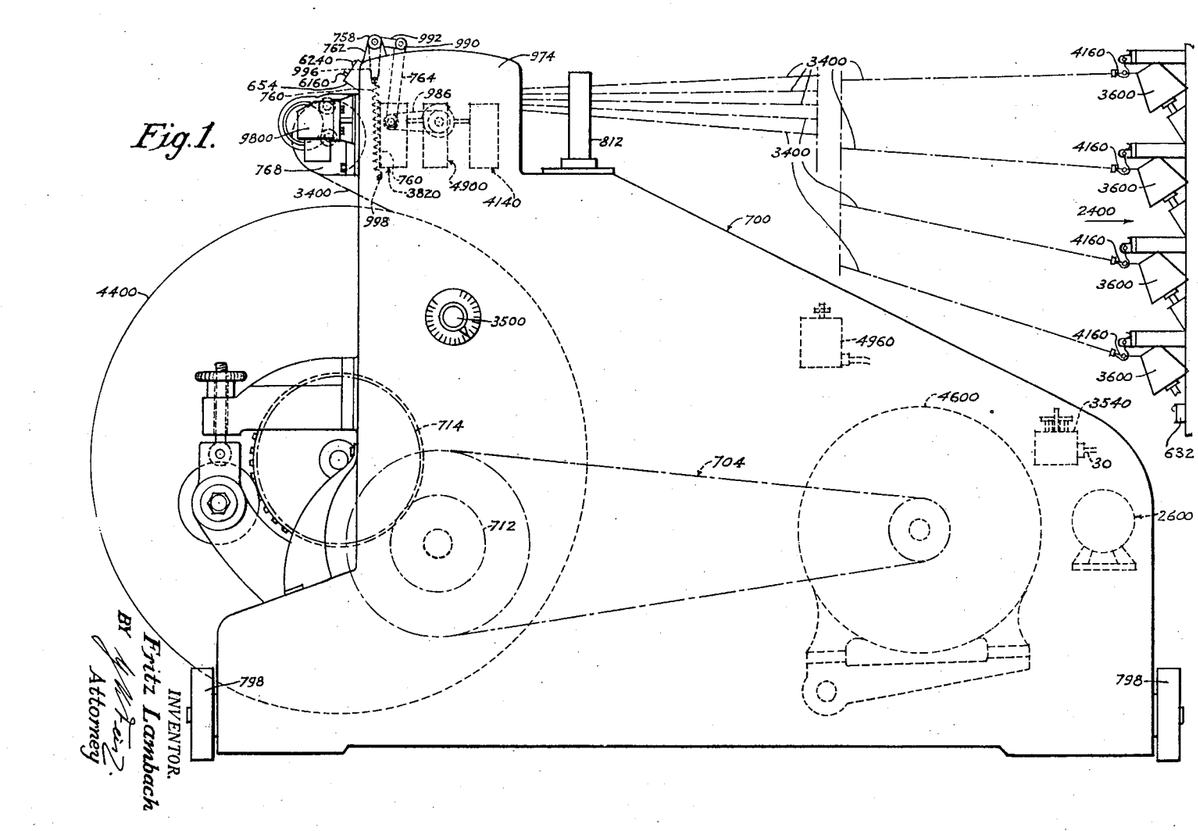
Fig. 1 an elevational view of a beaming plant including a beamer and a creel, only the end portion of said creel being shown in the drawings, Fig. 2 a fragmentary front elevational view of the upper portion of the beamer illustrating the controlling mechanism for the actuation of the "Stop-Inch-Start-Station" of the motor control system, Fig. 3 an elevational view of the "Stop-Inch-Start-Station" seen in the direction of the arrow 3 shown in Fig. 2.

Referring now to Fig. 1, 700 generally indicates a beamer, and 2400 generally indicates a creel arranged at a suitable distance from the former. An A. C. to D. C. motor generator set generally indicated by 2600 is mounted in a suitable manner within the casing of the beamer. The A. C. to D. C. motor generator set 2600 is supplied with alternating current from an electrical source (not shown) through the line 30 (see Fig. 5) leading to a hand switch 3540, which may be mounted on a wall of the beamer as indicated by broken lines in Fig. 1. The A. C. to D. C. motor generator set 2600 delivers direct current to various electrical equipments of the beaming plant through the electrical connections shown in Fig. 5.

A detailed description of the construction of the beamer may be found in my U. S. Patent #2,342,151 granted on February 22, 1944, on my patent application Ser. #457,134 divided out of this patent application Ser. #419,833. Hereinafter, only those parts of the beamer will be described, which are necessary for the understanding of the invention set forth in the appended claims.

A D. C. electromotor 4600 mounted in a suitable manner within the casing of the beamer 700 is one of the various electrical equipments of the beaming plant arranged for electrical connection with the A. C. to D. C. motor generator set 2600. If the electromotor 4600 is started in a manner to be described hereinafter, a beam 4400 inserted into the beamer in a suitable manner is rotated by the electromotor 4600 through the medium of a belt drive generally indicated by 704 and a gear transmission 712, 714. During the normal operation of the beaming plant the warp yarns 3400 travel from the bobbins 3600 mounted in the creel 2400 through a reed 812 secured to the casing of the beamer to a measuring roll 768 rotatably mounted on the beamer and thence to the beam 4400 driven by the electromotor 4600. The measuring roll 768 is arranged for driving a shut off counter 9800 in a suitable manner.

Figure 5:
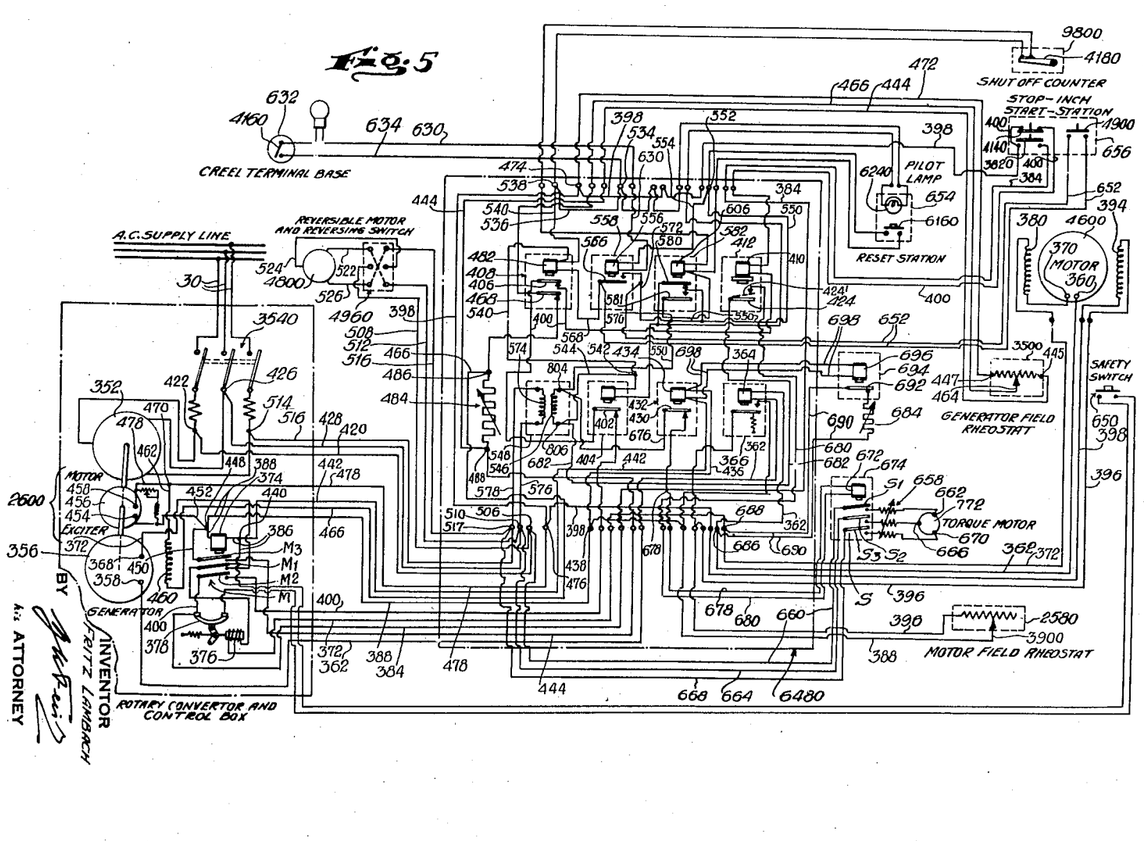

According to the invention, the electromotor 4600 may be controlled by a "Stop-Inch-Start-Station" 656 diagrammatically shown in the upper right portion of the wiring diagram illustrated in Fig. 5. Said "Stop-Inch-Start-Station" 656 comprises a start switch 3820, an inching speed switch 4900 and a stop switch 4140 arranged on the inside of an upper extension 974 of a side wall of the beamer as shown in Figs. 1—4. The electrical connection of these switches with the circuits of the electrical equipment of the beamer will be described hereinafter in connection with the description of the diagram of Fig. 5. At this portion of the specification it is sufficient to state, that a closing of both the start switch 3820 and the inching speed switch 4900 may cause an operation of the electromotor 4600 at an extremely low speed, i. e. a so-called inching speed, that a closing of the start switch 3820 alone may cause an operation of the electromotor 4600 at normal high speed, and that an opening of the stop switch 4140 causes an interruption of the supply of current from the A. C. to D. C. motor generator set 2600 for stopping the electromotor 4600.

Figures 3, 4:
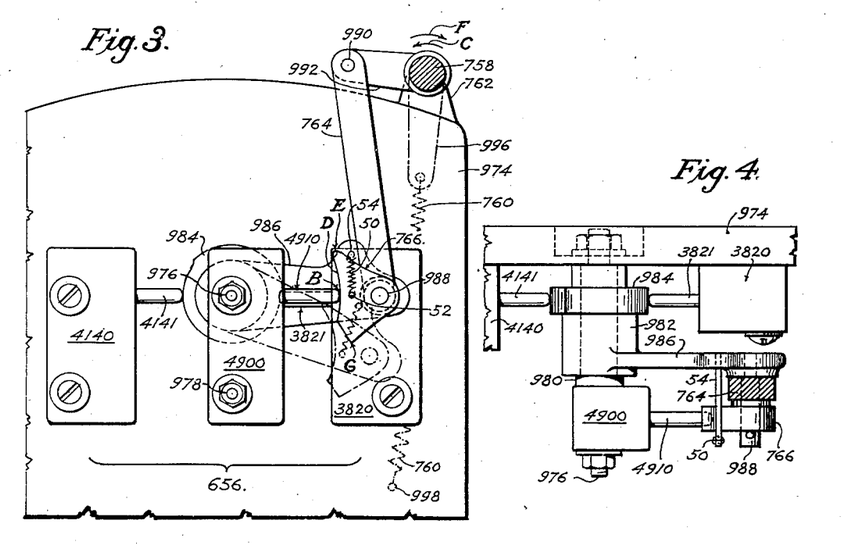

As best shown in Figs. 3 and 4, the start switch 3820 and the stop switch 4140 of the "Stop-Inch-Start-Station" 656 are directly mounted on the creel 2400 through a reed 812 secured to the casing of the beamer to a measuring roll 768 rotatably mounted on the beamer and thence to a beam 4400 inserted into the beamer and driven by an electromotor 4600 as will be described hereinafter.

The shaft 708 of the electromotor 4600 carries a grooved step pulley 706. A complementary step pulley 710 is secured to one end of a main shaft 702 rotatably arranged in a bearing 814 carried by the frame of the beamer. The other end of said main shaft 702 carries a pinion 712 and a friction pulley 816 keyed thereto. The main shaft 702 may be rotated by the electromotor 4600 through belts 704 trained around complementary portions of the step pulleys 706 and 710. The electromotor 4600 is mounted on a support 818 secured to a rod 820 rotatably arranged on a supporting member 822 resting on two spacing tubes 824 and 826 secured to the walls of the beamer. Owing to the described mounting of the electromotor 4600 the latter tends to swing the support 818 by its weight about the fulcrum 820 in clock-wise direction, whereby the belts 704 are automatically tensioned.

A pedal 828 is secured to the end of the rod 820 projecting from the wall of the beamer. If it is desired to change the speed ratio, the support 818 carrying the electromotor 4600 may be swung in counter-clockwise direction by means of the pedal 828, whereby the belts 704 are loosened, so that they may be easily transferred from one step of the complementary step pulleys 706 and 710 to the other step thereof. After the carrying out of this transfer the pedal may be released, so that the belts are automatically tensioned in their new position by the weight of the electromotor 4600 acting on the swingable support 818.

The beam 4400 to be inserted into the beamer has two flanges 830 and 832. A gear 714 is secured to the beam adjacent the flange 830. Furthermore a brake drum 734 and a brake drum 834 are secured to the beam outside the flanges 830 and 832 respectively. The gear 714 may be used for engagement with the driving pinion 712, and the brake drum 734 may be used for engagement with the driving friction pulley 816.

On each side of the beamer a supporting member or cradle 716 and 836 respectively is swingably arranged for receiving a beam 4400 and lifting same into operating position with the gear 714 in engagement with the pinion 712 and the brake drum 734 in engagement with the friction pulley 816. The supporting member 716 is rotatably mounted on the cylindrical surface of the bearing 814, as best shown in Figs. 1 and 4. Likewise, the supporting member 836 is rotatably mounted on the cylindrical surface of a bearing 838 secured to the other side wall of the beamer, as best shown in Fig. 3. A shaft 840 carrying a bearing roller 842 for engagement with the brake drum 834 of the beam 4400 is rotatably arranged in said bearing 838. Each supporting member 716 and 836 respectively is provided with a gear segment 718 and 844 respectively. The gear segment 718 meshes with a pinion 720, and the gear segment 844 meshes with a pinion 846. The pinions 720 and 846 are keyed to a transverse shaft 722 rotatably arranged in the side walls of the beamer. One end of the shaft 722 projects from the wall of the beamer and carries a worm gear 724 meshing with a self-locking worm 726 secured to the lower end of a spindle 728 rotatable in bearings 848, 850 mounted on the wall of the beamer. The upper end of the spindle 728 carries a hand wheel 730, by means of which the spindle may be rotated for lifting or lowering the supporting members 716 and 836. At the free end of each supporting member a roller 732 and 852 respectively is rotatably arranged for bearing engagement with the brake drums 734 and 834 respectively of the beam 4400.

In order to insert a beam into the beamer, the supporting members 716 and 836 are moved into their lower receiving position by turning the hand wheel 730 in one direction. In said receiving position, the bearing roller 732 is in the position 732' shown in Fig. 1. After a beam 4400 has been placed onto the supporting members, the latter are lifted by turning the hand wheel 730 in opposite direction, until the supporting members and beam reach the operating position shown in full lines in Fig. 1. In said operating position, the gear 714 is in engagement with the driving pinion 712, the brake drum 734 is in contacting engagement with the driving friction pulley 816 and the bearing roller 732, and the brake drum 834 is in contacting engagement with the bearing rollers 842 and 852. During the described lifting of the supporting members and the beam, rods 854 and 856 projecting from each end of the beam are in engagement with stationary cams 858 and 860 mounted on the frame of the beamer. The cams 858 and 860 are of such a shape, that they lift the teeth of the gear 714 to a certain extent above the teeth of the driving pinion 712, whereupon they permit an engagement of the teeth of the gear and pinion in a substantially radial direction. The self-locking worm 726 and a spring loaded pawl 862 cooperating with a ratchet wheel 864 secured to the spindle 728 prevent an undesired return of the supporting members 716 and 836 into the receiving position under the load of the beam. Furthermore, one end of a screw threaded bolt 866 and 868 respectively is pivoted to the free end of each supporting member at 870 and 872 respectively. When the supporting members 716 and 836 are in their upper operating position, the bolts 866 and 868 may be swung upwards into slots 874 and 876 respectively of brackets 878 and 880 respectively secured to the frame of the beamer; thereupon nuts 882 and 884 respectively may be screwed onto the ends of the bolts projecting from the brackets, whereby the supporting members 716 and 836 are locked in their upper position.

As best shown in Figs. 1 and 4, a lug 736 arranged on the swingable supporting member 718 cooperates with a spring loaded control element 651 of a safety switch 650 mounted on a wall of the beamer. As long as the lug 736 is disengaged from the control element 651 the spring (not shown) acting on said element holds the safety switch 650 in open position as shown in the right portion of the wiring diagram of Fig. 10. As will be described hereinafter, the safety switch 650 is arranged in the line 386 of the motor start circuit and motor start holding circuit, so that the electromotor 4600 cannot be operated as long as the safety switch 650 is in open position. The safety switch 650 is closed only upon engagement of the lug 736 with the spring loaded control element 651 when the supporting member 716 is in its upper operating position shown in full lines in Fig. 1. Therefore, the electromotor 4600 can be started and operated for driving the beam 4400 through the belts 704, pinion 712 and pulley 816 only when the beam carried by the supporting members 716 and 836 is in operating position with its gear 714 in mesh with the driving pinion 712 and with its brake drum 734 in contact with the driving friction pulley 816. As soon as, after a disengagement of the bolts 866 and 868 from the slots of the brackets 878 and 880 and after a disengagement of the pawl 862 from the ratchet wheel 864 by means of a lever 886, the hand wheel 730 is rotated for a lowering of the supporting members 716 and 836, the lug 736 is disengaged from the control element 551 of the safety switch 880, so that the latter is opened by its spring and the motor start circuit is interrupted, whereby a starting of the electromotor 4600 is rendered impossible.

Figure 2:
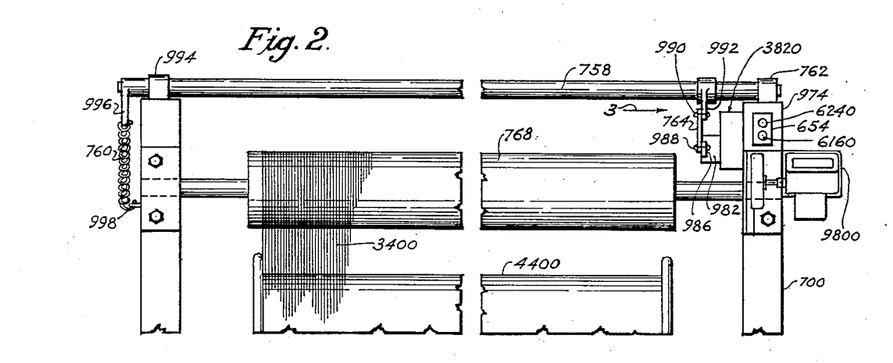

As best shown in Figs. 2 and 4, on each side of the beamer adjusting means, generally indicated by 888, are arranged for adjusting the beam 4400 in the direction of its longitudinal axis in a proper position relative to a pressure roll 1320 mounted in the beamer for cooperation with the winding on the beam in a manner to be described hereinafter. Each adjusting means 888 comprises a hollow sleeve 890 screwed into a screw threaded hole of the wall of the beamer. A rod 892 carrying at one end thereof a fork-like portion 894 extends through the bore of the sleeve. A roller 896 is rotatably arranged in the fork 894. The shoulder of the fork abuts against one end of the sleeve 890, and a set collar 898 secured to the rod rests on the other end of the sleeve, so that an inward or outward movement of the sleeve in the direction of its longitudinal axis upon rotation thereof by means of pins 900 secured thereto causes a corresponding inward or outward movement of the rod 892 and the roller 896. The free end of the rod has a square portion 902 slidably engaged with a slot of a bracket 904 secured to the wall of the beamer, whereby the rod is prevented from rotating in the sleeve 890. When, after the insertion of a beam into the beamer, the beam slidably resting on the rollers of the supporting members has been brought into the operating position, the beam may be shifted in the direction of its longitudinal axis into the proper position relative to the pressure roll by rotating the sleeve 890 of the proper adjusting means 888 for moving the roller 896 associated therewith inwards in contact with the surface of one brake drum of the beam and by continuing the inward movement of the roller, until the beam has been shifted by the roller into the desired position. Then, the roller of the other adjusting means 888 is moved inwards in contact with the surface of the other brake drum of the beam. Thus, the beam is guided by the two rollers of the two adjusting means during its rotation, whereby an undesired oscillation in the direction of its longitudinal axis is eliminated.

The pressure roll 1320 is rotatably mounted on a swingable assembly generally indicated by 738. The assembly 738 comprises two double-armed levers 906 and 908, one on each side of the beamer. The hub 910 of the lever 906 is swingably mounted on a stud 740 secured to a side wall of the beamer, and the hub 912 of the lever 908 is swingably mounted on a stud 914 secured to the opposite side wall of the beamer. A rod 916 is rigidly connected to the upper end of the long arm of the lever 906. One end of an arm 918 is secured to said rod 916, the other end of said arm 918 carries a roller bearing 920, wherein a shaft 922 secured to an end disc 924 of the pressure roll 1320 is rotatably arranged. Likewise a rod 926 is rigidly connected to the upper end of the long arm of the lever 908, and one end of an arm 928 is secured to said rod 926, while the other end of said arm 928 carries a roller bearing 930, wherein a shaft 932 secured to the opposite end disc 934 of the pressure roll 1320 is rotatably arranged. The two end discs 924 and 934 of the pressure roll 1320 are connected with each other by a cylindrical portion 936. Thus, the pressure roll 1320 is rotatable about the pivots 922 and 932 and is swingable to and fro the beam 4400 about the pivots 740 and 914.

The pivots 740 and 914 are arranged in such a relationship to the center of the pressure roll 1320, that the pressure roll tends to move by its own weight toward the beam 4400 in the direction of the arrow A shown in Fig. 1, whereby the pressure roll subjects the winding on the beam to a certain pressure. The position of the pressure roll varies in dependence on the diameter of the winding on the beam. When the pressure roll is in the position shown in Fig. 1, the beam is full and the diameter of the winding is large. At the beginning of the beaming operation, however, the diameter of the winding on the beam is considerably smaller, and the center of the pressure roll is considerably nearer to the center of the beam. Owing to this change in the position of the center of the pressure roll the latter would exert a considerably greater pressure on the winding on the beam at the beginning of the beaming operation, if there were no means provided for acting on the assembly 738 to compensate said difference in pressure. As best shown in Figs. 1—3 this compensating means comprises a tension spring 940 stretched between the long arm of the double-armed lever 908 and a stationary part 942 of the beamer. The spring 940 counteracts and compensates the action of the weight of the pressure roll on the winding on the beam, i. e. the nearer the pressure roll to the center of the beam and the greater the action of the weight of the pressure roll, the greater the expansion of the spring and the greater its counteraction. The spring 940 is so designed and arranged, that, during the entire beaming operation, the pressure roll subjects the winding on the beam to a substantially constant pressure irrespective of the variation in the position of the pressure roll in dependence on the increase of the diameter of the winding. When the pressure roll is in the position shown in Fig. 1, the spring 940 is contracted, so that it causes no action on the pressure roll assembly.

Furthermore, two counter-weights 742, one on each side of the beamer, counteract the action of the weight of the pressure roll on the winding on the beam, whereby the pressure on the winding is reduced to a low degree as it may be desirable for the beaming of warps of certain materials. Each counter-weight 742 is adjustably mounted on the long arm of a bell crank lever 944 pivoted to the side wall of the beamer at 946. The short arm of said bell crank lever is pivoted to one end of a link 948 at 950. The other end of said link 948 is pivoted to the short arm of the double-armed lever 906 or 908 respectively at 952. Adjustable set screws 954 serve to limit the extreme positions of the lever 944 and of the pressure roll assembly 738, 1320 connected with said lever.

If it is desired to subject the winding on the beam to an appreciable substantially constant pressure during the beaming operation, the arrangement shown in Fig. 9 may be used. The tension spring 940' acts on the assembly 738 carrying the pressure roll 1320 in the same manner as the tension spring 940 shown in Fig. 3. The weight 742', however, does not act as a counterweight but causes a pressure on the winding on the beam in addition to the pressure caused by the own weight of the pressure roll. The weight 742' is adjustably mounted on a lever 944' pivoted to the wall of the beamer at 946'. An intermediate point 950' of the lever 944' is pivotally connected with one end of the connecting link 948', the other end of which is pivoted to the short arm of the double-armed lever 906 or 908 respectively.

As best shown in Figs. 1—3, the double-armed lever 906 carries a gear segment 744 meshing with a pinion 746, and the double-armed lever 908 carries a gear segment 956 meshing with a pinion 958. Both pinions 746 and 958 are secured to a cross-shaft 748 rotatably arranged in the walls of the beamer. Said cross-shaft 748 carries a sprocket 750 connected with a sprocket 752 secured to a cross-shaft 754 by means of a chain 756. The cross-shaft 748 is rotatably arranged in suitable bearings and carries the movable finger (not shown) of an automatic motor field rheostat 2580 to be described hereinafter and the movable fingers (not shown) of an automatic three-phase resistor 658 to be described hereinafter. As will be readily understood, during the beaming operation, the pressure roll assembly 1320, 738 is moved in clockwise direction about the pivots 740 and 914 as viewed in Figs. 1 and 3 in accordance with the increase of the diameter of the winding on the beam 4400, so that the automatic motor field rheostat 2580 and the automatic three-phase resistor 658 are adjusted in dependence on the building up of the winding on the beam through the medium of the gear segments 744, 956, pinions 746, 958 and chain drive 750, 752, 756 for a purpose to be described hereinafter.

As best shown in Figs. 1 and 2, a bevel gear 960 is keyed to the cross-shaft 748 carrying the pinions 746 and 958. This bevel gear is in mesh with a bevel gear 962 secured to the lower end of a spindle 964 rotatably arranged in bearings 966 and 968 mounted on the frame of the beamer. A hand wheel 970 is secured to the upper end of said spindle 964. Thus, the pressure roll assembly 1320, 738 may be swung about the pivots 740 and 914 by hand by means of the hand wheel 970, spindle 964, bevel gears 960 and 962, pinions 746 and 958, and gear segments 744 and 956.

As best shown in Figs. 1 and 3, the warp yarns 3400 are trained around a measuring roll 768, the shaft 770 of which is rotatably mounted on the frame of the beamer, so that the measuring roll is rotated by the warp yarns during the beaming operation. The measuring roll 768 drives a shut off counter 9800 and a speedometer 1680 through the medium of a toothed gearing 972. The shut off counter 9800, which is secured to the frame of the beamer and may be of any well known type, serves to cause an automatic stoppage of the beamer as soon as the beam 4400 has performed a predetermined number of revolutions for which the shut off counter has been set. The speedometer 1680 mounted on the frame of the beamer serves to indicate the circumferential speed of the measuring roll 768.

The "Stop-Inch-Start-Station" 656 diagrammatically shown in the upper right portion of the wiring diagram illustrated in Fig. 10 comprises a start switch 3820, an inching speed switch 4900 and a stop switch 4140. The electrical connection of these switches with the circuits of the electrical equipment of the beamer will be described hereinafter in connection with the description of the diagram of Fig. 10. At this portion of the specification it is sufficient to state, that a closure of both the start switch 3820 and the inching speed switch 4900 may cause an operation of the electromotor 4600 at an extremely low speed, i. e., a so-called inching speed, that a closure of the start switch 3820 alone may cause an operation of the electromotor 4600 at normal high speed, and that an opening of the stop switch 4140 causes an interruption of the supply of current to the electromotor 4600 for stopping same.

As best shown in Figs. 1 and 4, the switches 3820, 4900 and 4140 of the "Stop-Inch-Start-Station" 656 are arranged on the inside of an upper extension 974 of a side wall of the beamer. As best shown in Figs. 7 and 8, the start switch 3820 and the stop switch 4140 are directly mounted on the inner surface of the extension 974 by screws. The inching speed switch 4900, however, is arranged at a certain distance from the inner surface of the extension 974 on bolts 976 and 978 secured to the extension 974. The inching speed switch 4900 rests against a collar 980 on the bolt 976. A member 982 carrying a cam 984 and a lever 986 is rotatably arranged on said bolt 976 between the collar 980 and the extension 974. The cam 984 cooperates with the spring loaded control elements 3821 and 4141 (the springs are not shown) of the start switch 3820 and the stop switch 4140. The lever 986 carries a stud 988 at its free end. One end of a link 764 is swingably arranged on said stud 988. The other end of said link 764 is pivotally connected at 990 to the free end of a lever 992 keyed to a shipper rod 758 rotatably mounted in bearings 762 and 994 mounted on the side walls of the beamer as best shown in Fig. 2. A lever 996 (see Figs. 1—3) is secured to the end of the shipper rod 758 projecting from the bearing 994, and a tension spring 760 is stretched between the free end of said lever 996 and a stationary point 998 (Figs. 1 and 3) in such a way, that the spring tends to hold the mechanism 758, 992, 764, 986, 984, 766 in an intermediate neutral position shown in full lines in Fig. 3. A cam-like actuating element 766 adapted to cooperate with the spring loaded control element 4910 (the spring is not shown) of the inching speed switch 4900 is swingably mounted on the stud 988 carried by the lever 986. A tension spring 50 stretched between a point 52 of the element 766 and a stop 54 secured to the lever 986 tends to urge said element 766 against said stop 54 as shown in full lines in Fig. 3.

The operation of the mechanism of the "Stop-Inch-Start-Station" is as follows:

When the beamer is at a standstill, the mechanism 758, 992, 764, 986, 984, 766 is in the neutral position shown in full lines in Fig. 3, wherein the spring loaded control elements 3821 and 4141 of the start switch 3820 and stop switch 4140 contact the inactive round portion of the cam 984 and the spring loaded control element 4910 of the inching speed switch 4900 contacts the cam surface of the element 766 at the inactive point B, so that the springs (not shown) acting on the control elements 3821 and 4910 of the start switch 3820 and inching speed switch 4900 hold these switches in the open position shown in Fig. 5, and the spring (not shown) acting on the control element 4141 of the stop switch 4140 holds same in the closed position shown in Fig. 5. In order to start the electromotor 4600 of the beamer, the shipper rod 758 is turned by hand through a certain angle into an intermediate position in the direction of the arrow C shown in Fig. 3. During this rotation of the shipper rod 758 through said limited angle, the cam 984 is rotated in clockwise direction and its elevated portion urges the control element 3821 against the action of its spring to the right, whereby the start switch 3820 is closed. At the same time, the lever 986 is turned in clockwise direction and the active portion B—D of the cam-like surface of the element 766 resting against the stop 54 slides along the control element 4910 and urges same against the action of its spring to the left, whereby the inching speed switch 4900 is closed. Thus, the start switch 3820 and the inching speed switch 4900 are closed and the electromotor 4600 is operated at inching speed as long as the shipper rod 758 is held against the action of the spring 760 in above described position wherein the elevated portion of the cam 984 contacts the control element 3821 and the point D of the element 766 contacts the control element 4910.

If the shipper rod 758 is turned further from the intermediate position in the direction of the arrow C into an extreme active position, the cam 984 and the lever 986 are turned further in clockwise direction. The elevated portion of the cam 984 is of such a length, that, during this continuation of the rotation of the shipper rod 758, the elevated portion of the cam remains in contact with the control element 3821 and holds the start switch 3820 in closed position; the point E of the element 766, however, slips off the free end of the control element 4910, whereby the control element 4910 is released and the spring acting on said control element 4910 returns same into the position shown in Fig. 3 for an opening of the inching speed switch. Thus, the start switch 3820 remains in closed position, while the inching speed switch 4900 is opened, so that the electromotor 4600 is operated at normal high speed.

As soon as the shipper rod 758 is released, the spring 760 causes a rotation of the shipper rod in the direction of the arrow F and a return of the mechanism 758, 992, 764, 986, 984, 766 into the neutral position shown in full lines in Fig. 3. During said return of the mechanism, the cam 984 and the lever 986 are rotated in counter-clockwise direction. Shortly before the cam 984 reaches the neutral position, the elevated portion of the cam is disengaged from the control element 3821 and the latter is urged by its spring against the inactive round portion of the cam, whereby the start switch 3820 is returned into open position. Furthermore, during said return of the mechanism, the inching speed switch 4900 is not actuated and remains in its open position for the following reasons: During the return of the lever 986 in counter-clockwise direction, the point E of the swingable element 766 hits the lower surface of the control element 4910, whereby the swingable element 766 is swung against the action of the spring 50 in counter-clockwise direction about the pivot 988 without altering the position of the control element 4910 as indicated in dash and dot lines in Fig. 3. Shortly before the lever 986 reaches the neutral position, the point E of the swingable element 766 slips off the free end of the control element 4910, so that the swingable element 766 is swung by the spring 50 in clockwise direction about the pivot 988 against the stop 54. Thus, no actuation of the inching speed switch 4900 has taken place and all elements of the mechanism 758, 992, 764, 986, 984, 766 are again in the position shown in full lines in Fig. 5 after the return of said mechanism by the spring 760 into the neutral position. Although the start switch 3820 is opened after the release of the shipper rod 758 and the return of the mechanism into the neutral position, the high speed operation of the electromotor 4600 is continued in the embodiment of the beamer shown in the drawings, as the electrical connections include a motor start holding circuit as will be described hereinafter in connection with the description of Fig. 5.

During above described movement of the shipper rod 758 from the neutral position in the direction of the arrow C and back into the neutral position in the direction of the arrow F, the stop switch 4140 is not actuated, as only the round inactive portion of the cam 984 contacts the control element 4141 and does not cause a shifting thereof.

If it is desired to stop the beamer by hand, the shipper rod 758 is turned from the neutral position shown in Fig. 3 in the direction of the arrow F into a second extreme active position. This rotation of the shipper rod causes a rotation of the cam 984 in counter-clockwise direction. As soon as the elevated portion of the cam 984 engages the spring loaded control element 4141, the latter is urged against the action of its spring (not shown) to the left, whereby the stop switch 4140 is opened and the beamer is immediately stopped. Upon release of the shipper rod, the latter is turned in the direction of the arrow C by the spring 760 and the mechanism 758, 992, 764, 986, 984, 766 is returned into the neutral position shown in full lines in Fig. 3, wherein the stop switch 4140 is closed and the start switch 3820 and the inching speed switch 4900 are opened as described above.

During above described movement of the shipper rod 758 from the neutral position in the direction of the arrow F and back into the neutral position in the direction of the arrow C, the start switch 3820 and the inching speed switch 4140 are not actuated. During said movement of the shipper rod, only the round inactive portion of the cam 984 contacts the control element 3821 of the start switch, so that the position thereof remains unchanged. Furthermore, the surface B—G of the element 766 is of such a shape, that it does not cause any movement of the control element 4910 of the inching speed switch 4900, when the lever 986 is swung in counter-clockwise direction from the neutral position and is returned subsequently into said neutral position.

Referring now to Fig. 5 illustrating the wiring system for the electrical equipment of the beaming plant, the circuits for the operation and the control of certain parts of the beaming plant will be described hereinafter. For the remaining circuits reference is had to the description of said remaining circuits in my Patent #2,324,611 relating to "An Electrical Control System for a Warping or Beaming Plant" issued on July 20, 1943, wherein said circuits are more fully described.

The A. C. motor 352 of the A. C. to D. C. motor generator set 2600 is supplied with alternating current from an electric source (not shown) through the lines 39 upon closure of the hand switch 3540. The generator 356 of the A. C. to D. C. motor generator set 2600 produces the direct current.

The generator 356 is arranged in the following main motor circuit: The terminal 358 of the generator 356 is connected with the terminal 360 of the driving D. C. electromotor 4600 of the beamer through the line 362 including the electromagnet 364 of a motor field vibrating relay 366. The terminal 368 of the generator 356 is connected with the terminal 370 of the driving electromotor 4600 through the line 372 including the pole M₁ of the triple pole main switch M controlled by the trip coil magnet 374, the solenoid 376 of an overload circuit breaker and the series field 380 of the electromotor 4600.

As will be apparent from the foregoing, the electromotor 4600 driving the beam inserted into the beamer may be started by closing the pole M₁ of the main switch M. This pole M₁ may be closed by an energization of the trip coil magnet 374, which is arranged in the following motor start circuit: A line 384 leads from the right-hand terminal of the start switch 3820 to the left-hand terminal of the overload circuit breaker 378, the right-hand terminal of which is connected with the trip coil magnet 374 by the line 386 including the safety switch 650 controlled by the lug 736 on the swingable supporting member 716 in the manner described above. A line 388 leads from the trip coil magnet 374 to the movable finger 3900 of the automatic motor field rheostat 2580 controlled by the movable pressure roll assembly of the beamer in dependence on the increase of the diameter of the winding on the beam 4400 during the operation of the beamer. The coil 3920 of the automatic motor field rheostat 2580 is connected with one end of the shunt field 394 of the electromotor 4600 through a line 396. The other end of the shunt field 394 is connected with the left-hand terminal of the start switch 3820 through a line 398. Current is supplied to above described motor start circuit from the exciter 456 of the A. C. to D. C. motor generator set 2600 by means of a line 452 connecting the terminal 454 with a junction point 448 in the line 388 and by means of a line 478 connecting the terminal 458 with a junction point 476 in the line 398. A safety switch 650 mounted in a suitable manner on the beamer 700 is held in its open position as long as a beam 4400 is not lifted into the operating position shown in Fig. 1. Furthermore, the start switch 3820 is normally held in its open position by the action of a spring (not shown) as described above. If the safety switch 650 is closed upon a movement of the beam into the operating position shown in Fig. 1, and if the start switch 3820 is closed by a rotation of the shipper rod in the direction of the arrow C from the neutral position shown in Fig. 3, the above described motor start circuit is closed, whereby the trip coil magnet 374 is excited for closing the main switch M with its pole M₁, which in turn closes the above described main motor circuit for starting the electromotor 4600. The action of the inching speed switch 4900, which is closed simultaneously with the start switch 3820 and causes a slow speed operation of the motor 4600 will be described hereinafter in connection with the description of the circuits including said inching speed switch.

When the trip coil magnet 374 is excited by closing above described motor start circuit by means of the spring loaded start switch 3820, the pole M₂ of the main switch M is also closed, whereby a motor start holding circuit including the trip coil magnet of the main switch is closed as will be described hereinafter, so that the main switch remains in closed position upon a subsequent release of the spring loaded start switch by a return of the mechanism controlling the start switch into the neutral position shown in Fig. 3. Said motor start holding circuit may be traced as follows starting from the left-hand terminal of the start switch 3820: The line 398, the shunt field 394, the automatic rheostat 2580, the line 388, the trip coil magnet 374 of the main switch M, the line 386, the safety switch 650, the bridge of the overload circuit breaker 378, and the line 400 connecting the left-hand terminal of the circuit breaker 378 with the left-hand terminal of the start switch 3820, said line 400 including the pole M₂ of the main switch M, the switch 402 of a counter stop relay 404, the switch 406 of a warp brake relay 408, the electromagnet 410 of a time relay 412, and the stop switch 4140 normally held in closed position by a spring (not shown).

The main switch M is opened and the supply of direct current to the electromotor 4600 is interrupted at the pole M₁, as soon as the above described motor start holding circuit including the trip coil magnet 374 is interrupted either at the stop switch 4140 or at the circuit opening switch 406 of the warp brake relay 408 or at the circuit opening switch 402 of the counter stop relay 404 or at the safety switch 650. The opening of the spring loaded stop switch 4140 takes place when the beamer is arrested by hand by turning the shipper rod 758 in the direction of the arrow F from the neutral position shown in Fig. 3. The opening of the switch 406 takes place when one or more control needles 4160 in the creel 2400 drop and close a needle control circuit owing to a breakage of yarn as will be described hereinafter. The opening of the switch 402 takes place when the normally closed switch 4180 of the shut off counter 9800 is opened after the performance of a predetermined number of revolutions of the beam as more fully described in my Patent #2,324,611 issued on July 20, 1943. The opening of the safety switch 650 takes place when the supporting member carrying the beam 4400 moves away from the operating position.

Any of above mentioned interruptions of the motor start holding circuit causes an energization of an electromagnet 672 of a torque motor relay 674, whereby a three-pole switch S is closed for supplying current to a torque motor 772 associated with the brakes of the beamer, so that the torque motor is excited and the brakes of the beamer are applied. The electromagnet 672 of the torque motor relay 674 is arranged in the following brake circuit starting from the terminal 804 of the secondary winding 546 of a low voltage transformer 548: A line 676 leading from the terminal 804 of the secondary winding to the left-hand terminal of a brake control switch 430 controlled by the electromagnet 434 of a brake control relay 432; a line 678 connecting the right-hand terminal of the brake control switch 430 with the electromagnet 672; a line 680 connecting the electromagnet 672 with the right-hand terminal of the switch 424 of the time relay 412; and a line 682 connecting the left-hand terminal of the switch 424 with the terminal 806 of the secondary winding 546. The primary winding 574 of the low voltage transformer 548 is connected with two lines of the A. C. supply line in the following manner: a line 428 leading from the junction point 426 to the junction point 510 connected with one end of the primary winding 574 by a line 576; the portion of a line 516 between a junction point 514 and a junction point 517, and a line 578 connecting the junction point 517 with the other end of the primary winding 574. The electromagnet 434 controlling the brake control switch 430 of the brake control relay 432 is arranged in the following brake control circuit: A line 436 leading from the electromagnet 434 to the junction point 438, the portion of the line 388 from said junction point 438 to the trip coil magnet 374, the portion of the line 386 leading from the trip coil magnet 374 to the junction point 440, and the line 442 connecting said junction point 440 with the electromagnet 434. Thus, as soon as the motor start holding circuit including the trip coil magnet 374 is interrupted at the stop switch 4140 or the circuit opening switch 406 or the circuit opening switch 402 or the safety switch 650, the described brake control circuit including the electromagnet 434 of the brake control relay 432 is also interrupted, so that the electromagnet 434 is deenergized and the brake control switch 430 is closed. At the same time, the electromagnet 410 of the time relay 412, which is arranged in the motor start holding circuit including the trip coil magnet 374 is also deenergized. Owing to the delaying action of the time relay 412, however, the switch 424 remains for a short period, for example 2 sec., in the closed position 424' shown in dash lines, so that the brake circuit including the electromagnet 672 of the torque motor relay 674 will be closed and the latter will cause a closing of the switch S for an energization of the torque motor 772 and an application of the various brakes of the beamer, as soon as the electromagnet 434 of the brake control relay 432 is deenergized and the brake control switch 430 thereof is closed. After said short period of 2 sec., for example, however, the switch 424 of the deenergized time relay 412 comes into the open position shown in full lines, so that the electromagnet 672 of the torque motor relay 674 is deenergized, whereby the switch S is opened and the supply of current to the torque motor 772 is interrupted. Thus, the brakes of the beamer are released after a short period of application corresponding to the delaying action of the time relay. Incidentally, it may be mentioned, that a restarting of the electromotor 4600 causes an energization of the electromagnet 410 of the time relay 412, which is arranged in the motor start holding circuit, so that the switch 424 is again closed so as to render the brake circuit ready for the next braking operation in the manner described above.

The torque motor 772 is connected with the three phases of the A. C. supply line in the following manner: A line 420 leading from the junction point 422 to the junction point 506, a line 660 leading from the junction point 506 to the terminal 662 of the torque motor, said line including the pole S₁ of the triple pole switch S controlled by the electromagnet 672 and a first coil of the adjustable resistor 658 controlled by the pressure roll assembly the beamer in dependence on the increase of the diameter of the winding on the beam; the line 428 leading from the junction point 426 to the junction point 510, a line 664 leading from the junction point 510 to the terminal 666 of the torque motor, said line including the pole S₂ of the switch S and a second coil of the adjustable resistor 658; the portion of the line 518 leading from the junction point 514 to the junction point 517, a line 668 leading from the junction point 517 to the terminal 670 of the torque motor, said line including the pole S₃ of the switch S and a third coil of the adjustable resistor 658. Thus, above described closing of the switch S by the electromagnet 672 causes a supply of alternating current to the torque motor 772, and the output of the torque motor is controlled by the adjustable resistor 658 in dependence on the diameter of the winding on the beam.

In the embodiment shown in Fig. 5, the electrical control system for the beamer is also equipped with an electrical brake, which becomes effective in addition to the mechanical brakes of the beamer actuated by the torque motor. For this purpose an adjustable dynamic braking resistor 684 is connected with the junction points 686 and 688 in the lines 362 and 372 of the main motor circuit by means of a line 690 including a switch 692 of a dynamic resistor relay 694. The electromagnet 696 of said relay 694 is arranged in parallel to the electromagnet 434 of the brake control relay 432 by means of lines 698. Therefore, the electromagnet 696 is excited and the switch 692 controlled by said electromagnet is open as long as the motor start holding circuit is closed and the electromotor 4600 drives the beam. As soon as the motor start holding circuit is interrupted in any of above described manners and the electromagnet 434 of the brake control relay 432 and the electromagnet 696 of the dynamic resistor relay 694 are deenergized, the switch 692 is closed and shorts the electromotor 4600 through the dynamic braking resistor 684, whereby an additional braking of the rotating mass of the beam connected with the electromotor is obtained. The above described electrical brake including the adjustable dynamic braking resistor 684 may be used for an additional adjustment of the braking time required for bringing the mass of the beam to a standstill. Of course, the electrical brake may be entirely omitted, if desired.

As pointed out above, the automatic motor field rheostat 2580 controlled by the pressure roll assembly of the beamer, in dependence on the increase of the diameter of the winding on the beam 4400 is arranged in the motor start holding circuit. Said motor field rheostat 2580 serves to cause an automatic reduction of the operating speed of the electromotor 4600 from a predetermined normal degree to a lower degree, so that a substantially constant travelling speed of the warp yarns resulting in a substantially constant tension in the yarns is obtained during the operation of the beamer. The normal travelling speed of the warp yarns is determined by said predetermined normal operating speed of the electromotor 4600 at the beginning of the beaming operation after the termination of the inching speed operation. Different yarns of different size and/or material require different travelling speeds to obtain the proper tension in the yarns. For this purpose, an additional electrical adjusting means or a generator field hand rheostate 3500 is mounted on a side wall of the beamer as shown in Fig. 1. The generator field hand rheostat 3500 may be used for a manual adjustment of said predetermined normal operating speed of the electromotor 4600 driving the beam and is arranged in the following normal speed control circuit: A line 444 leads from the end 445 of the coil 446 of the generator field hand rheostat 3500 to the pole M₃ of the main switch M, which in turn is connected with the junction point 448 in the line 388 by a line 450. The line 452 leads from said junction point 448 to the terminal 454 of the exciter 456. The terminal 458 of the exciter 456 is connected with one end of the field 460 of the D. C. generator 356 by a portion of the line 478 at the point 470. The other end of the field 460 is connected with the movable finger 464 of the hand rheostat 3500 through a line 466 including the speed control switch 468 of the warp brake relay 408. The end 447 of the coil 448 of the hand rheostat 3500 is connected with the junction point 470 through a line 472 leading to a junction point 474, through the portion of the line 398 connecting the junction point 474 with a junction point 476, and through a portion of the line 478 connecting the junction point 476 with the junction point 470. As will be apparent from the described connections, the generator field 460 is energized by the exciter 456 which generates a constant potential. This potential is applied to a circuit comprising the left-hand portion (as viewed in Fig. 5) of the coil 446 of the generator field hand rheostat 3500 in parallel with the generator field 460 and the right-hand portion of the coil 446 of the generator field hand rheostat 3500 in series with these. A manual movement of the finger 464 across the generator field hand rheostat 3500 will cause a variation of the potential applied to the generator field 460 and, consequently, a variation of the current flowing through this generator field during the normal operation of the beamer. If, for example, the finger 464 is moved to the right, the energization of the generator field and the current flowing through said generator field are increased. Therefore, the current flowing through the generator field is in proportion to the setting of the finger 464 of the hand rheostat 3500. This current, when high, gives a high voltage generated by the generator 356, when low, a low voltage generated, i. e. the potential generated by the generator is variable. The normal operating speed of the electromotor 4600 at the beginning of the beaming operation after the termination of the inching speed operation is determined by the voltage of the direct current supplied to the electromotor, and, therefore, the normal operating speed of the electromotor may be easily adjusted by means of the generator field hand rheostat 3500.

As will be apparent from the foregoing, the generator field hand rheostat 3500 serves to adjust a predetermined normal operating speed of the electromotor 4600 of the beamer by hand, while the automatic motor field rheostat 2580 controlled by the pressure roll assembly of the beamer serves to automatically reduce the operating speed of the electromotor 4600 from said predetermined normal value to a lower value, so as to obtain a substantially constant tension in the yarns and/or constant travelling speed of the yarns respectively during the beaming operation. For a better explanation of my invention, the operation of the electromotor at said normal operating speed and at said reduced lower operating speed shall be termed the "normal high speed operation" of the electromotor in contrast to the very low speed operation or the so-called "inching speed operation" of the electromotor 4600, which is desirable under certain circumstances, for example, first, after the occurrence of a yarn breakage and the tying of the ends of the broken yarn, until the slack in the yarn or yarns has been taken up, or, second, at the beginning of a beaming operation, until a few layers of the winding have been wound on the beam.

The operation of the electromotor 4600 at "normal high speed operation" or at "inching speed operation" is controlled by the speed control switch 468 of the warp brake relay 408, which in turn is controlled by the control needles 4160 in the creel and/or by the inching speed switch 4900 on the beamer as will be described hereinafter. The speed control switch 468 is arranged in the normal speed control circuit including the generator field 460 and the generator field hand rheostat 3500 as described above. As long as the electromagnet 482 of the warp brake relay 408 is deenergized and the speed control switch 468 is closed, the electromotor 4600 may operate at normal high speed operation as described above. If, however, the speed control switch 468 is opened by an energization of the electromagnet 482 upon the dropping of a control needle 4160 owing to a breakage of yarn or upon the manual closing of the inching speed switch 4900, the generator field hand rheostat 3500 is disconnected from the generator field 460. An adjustable inching resistor 484 is arranged in series with the generator field 460 between the junction points 486 and 488 in the lines 466 and 444 respectively, so that, after the above mentioned disconnection of the generator field hand rheostat 3500 from the generator field 460, the current now may flow through the following inching speed control circuit: exciter 456, line 462, generator field 460, line 466, inching resistor 484, line 444, pole M3, lines 450, 452. Therefore, under these circumstances and upon a closing of the main switch M including the pole M3, a current proportional to the combined resistance of the generator field 460 and the adjustable inching resistor 484 arranged in series with each other will pass through the generator field, setting up a flux which will produce the low voltage required for the low inching speed and the low torque of the electromotor 4600. It may be mentioned, that this flux, and therefore voltage and torque, are independent of the setting of the generator field hand rheostat 3500, as the latter is disconnected from the generator field 460. On the other hand, the generator field hand rheostat 3500 will be reconnected with the generator field 460 and a further operation of the electromotor 4600 at inching speed will be rendered impossible as soon as the speed control switch 468 controlled by the electromagnet 482 of the warp brake relay 408 will be returned into closing position upon a return of the control needle 4160 and/or the inching speed switch 4900 into open position.

Now, the circuits controlling the electromagnet 482 of the warp brake relay 408 containing the speed control switch 468 will be descsribed.

The electromagnet 482 is arranged in the following warp brake relay control circuit: A line 568 connects the electromagnet 482 with the left-hand terminal of a switch 566 controlled by an electromagnet 556 of a warp brake sensitive intermediate relay 558; a line 572 leads from the right-hand terminal of said switch 566 to a junction point 570 in a line 550; the portion of the line 550 that leads from said junction point 570 to the terminal 604 of the secondary winding 546 of the lower voltage transformer 548; the secondary winding 546; a line 544 leading from the secondary winding 546 to the junction point 542, and the portion of a line 540 that leads from said junction point 542 to the electromagnet 482. Obviously, the electromagnet 482 of the warp brake relay 408 will be excited for opening the speed control switch 468, as soon as the electromagnet 556 of the warp brake sensitive intermediate relay 558 is excited for closing the switch 566.

The electromagnet 556 is arranged in the following needle control circuit: A line 630 connecting the electromagnet 556 with one terminal of a creel terminal base 632 mounted on the creel 2400; the control needle 4160, a line 634 leading from the other terminal of the creel terminal base 632 to the junction point 534; the line 536 connecting the junction point 534 with the junction point 538; the portion of the line 540 that connects the junction point 538 with the junction point 542; the line 544; the secondary winding 546 of the low voltage transformer 548; the line 550 up to the junction point 552; and a line 554 connecting the junction point 552 with the electromagnet 556. Although Fig. 5 diagrammatically illustrates only one control needle 4160 arranged on the creel terminal base 632, the creel carries a plurality of control needles 4160, one for each warp yarn 3400 to be drawn from a bobbin 3600 as shown in Fig. 1.

If one or more control needles 4160 of the creel drop owing to a breakage of yarn, the above described needle control circuit is closed, whereby the electromagnet 556 of the warp brake sensitive intermediate relay 558 is excited, so that the switch 566 is closed which in turn causes an excitement of the electromagnet 482 of the warp brake relay 408 resulting in an opening of the speed control switch 468 and of the circuit opening switch 406. The latter causes an intermediate stoppage of the beamer and application of the brakes as described above. The brakes are released after a short period of application as described above. The switches 406 and 468, however, remain in open position after the tying of the ends of the broken yarn as long as one or more control needles 4160 are in dropped position due to slack in a yarn or yarns. Thus, the electromotor 4600 can be restarted at inching speed only by closing the start switch 3820 by hand and holding same in closed position, until the slack in the yarns has been taken up; as soon as, upon removal of the slack in the yarns, all control needles 4160 are again in their open position and the switches 406 and 468 are again closed, the start switch 3820 may be released for return into the neutral position shown in Fig. 3 by the action of the spring 760, whereupon the operation of the electromotor 4600 will continue at normal high speed, as now the motor start holding circuit including the switch 406 and the normal speed control circuit including the switch 468 are closed.

The manual inching speed switch 4900 is connected with the warp brake relay control circuit in parallel to the switch 566 of the warp brake sensitive intermediate relay 558 by lines 652. Thus, a closing of the inching speed switch 4900 may also cause an energization of the electromagnet 482 of the warp brake relay 408 and an opening of the switches 406 and 468. As pointed out above, the inching speed switch 4900 is normally in the neutral position shown in Fig. 3, wherein the spring acting on its control element 4910 holds the inching speed switch in open position. If, for the start of the beamer, the shipper rod 758 (Fig. 3) is turned in the direction of the arrow C into the intermediate position described above, both, the start switch 3820 and the inching speed switch 4900 are closed. Although the closing of the inching speed switch 4900 causes an opening of the circuit opening switch 406 arranged in the motor start holding circuit, the electromotor 4600 may be operated as long as the start switch 3820 arranged in the motor start circuit is held in closing position; but, the electromotor 4600 may be operated at inching speed only, as, under these circumstances, the speed control switch 468 is also held in open position by the closing of the inching speed switch 4900. As soon as, after the laying of a few windings on the beam, the shipper rod 758 is turned further from the intermediate position in the direction of the arrow C into the extreme active position, the inching speed switch 4900 is opened, while the start switch 3820 remains in closed position. The opening of the inching speed switch 4900 causes an automatic closing of the speed control switch 468 resulting in an automatic increase of the speed of operation of the electromotor 4600 to normal high speed operation. Furthermore, the opening of the inching speed switch 4900 results in the closing of the motor start holding circuit by the switch 406. Now, the shipper rod 758 may be released for a return into the neutral position by the action of the spring 760; the operation of the electromotor 4600 continues at normal high speed, as the switches 406 and 468 controlled by the electromagnet 482 in response to the opening of the inching speed switch 4900 are in closed position.

The operation of the electromotor 4600 is arrested and the brakes of the beamer are applied, when the shipper rod 758 is turned from the neutral position in the direction of the arrow F (Fig. 3) for an opening of the stop switch 4140, or when a control needle 4160 drops and causes an opening of the switch 406, or when the safety switch 650 is opened; in all these cases the motor start holding circuit is interrupted.

Furthermore, an interruption of the motor start holding circuit resulting in a stoppage of the electromotor 4600 and an application of the brakes takes place, when the normally closed switch 4180 of the shut off counter 9800 is opened after the performance of a predetermined number of revolutions of the beam and causes an opening of the switch 402 of the counter stop relay 404. Reference is had to my Patent #2,324,611 relating to "An Electrical Control System for a Warping or Beaming Plant," issued on July 20, 1943, for a full description of the circuits connecting the shut off counter 9800 with the counter stop relay 404.

Moreover, reference is had to the same Patent #2,324,611 issued on July 20, 1943, for a detailed description of the "Reset Station" 654 with the reset push button 6160 and the pilot lamp 6240 and their electrical connections with the electrical control system. Incidentally, it may be mentioned, that the electromagnet 606 of the shut off counter relay 582 is excited and the switch 580 of said relay is opened and the switch 581 of said relay is closed when the electrical control system is set for an operation of the beaming plant upon an actuation of the spring loaded reset push button 6160. The "Reset-Station" 654 is mounted on the extension 974 of the side wall of the beamer as best shown in Figs. 1 and 2.

A reversible motor 4800 for driving the rollers 798 and moving the beamer sidewise in one direction or the other is electrically connected through lines 522, 524, 526 with a hand reversing switch 4960 mounted on the wall of the beamer. The reversing switch 4960 is electrically connected with the junction points 506, 510, 517 through lines 508, 512 and 516.

I have described preferred embodiments of my invention, but it is clear that numerous changes and ommissions may be made without departing from the spirit of my invention.

What I claim is:

1. A beamer comprising: an electromotor for rotating a beam to wind the warp thereon, a start switch for an electrical connection with said electromotor, a stop switch for an electrical connection with said electromotor, and movable controlling means for the actuation of both said start switch and said stop switch, said controlling means being normally in a neutral position and being adapted to render operative said start switch upon a movement in one direction from the neutral position and being adapted to render operative said stop switch upon a movement in the opposite direction from the neutral position.

2. A beamer comprising: an electromotor for rotating a beam to wind the warp thereon, a start switch for an electrical connection with said electromotor, a stop switch for an electrical connection with said electromotor, a controlling assembly for the actuation of said start switch and said stop switch, said assembly including a movable controlling member and a rotatable actuating cam, said controlling member being operatively connected with said cam, and means associated with said controlling assembly for normally holding the elements thereof in a neutral position, said cam being adapted to render operative said start switch upon a rotation in one direction from the neutral position and being adapted to render operative said stop switch upon a rotation in the opposite direction from the neutral position.

3. A beamer comprising: an electromotor for rotating a beam to wind the warp thereon, a start switch for an electrical connection with said electromotor, an inching speed switch for an electrical connection with said electromotor, and movable controlling means for the actuation of said start switch and said inching speed switch, said controlling means being normally in a neutral position and being adapted to render active said start switch and to render active and subsequently to render inactive said inching speed switch during a movement from the neutral position.

4. A beamer comprising: an electromotor for rotating a beam to wind the warp thereon, a start switch for an electrical connection with said electromotor, an inching speed switch for an electrical connection with the electromotor, and a controlling assembly for the actuation of said start switch and said inching speed switch, said controlling assembly being normally in a neutral position and including a movable controlling member, a rotatable actuating cam, a swingable lever, an actuating element pivotally mounted on said lever, stopping means on said lever for limiting the movement of said actuating element in one direction, and a spring associated with said actuating element for urging same against said stopping means, said controlling member being operatively connected with said actuating cam and said lever for a simultaneous movement of these elements from and into the neutral position, said actuating cam being adapted to render active said start switch during a movement of the controlling member from the neutral position into an extreme active position, said actuating element being adapted to render active and subsequently to render inactive said inching speed switch during said movement of the controlling member from the neutral position into the extreme active position, and said actuating element being adapted to yield against the action of its spring without rendering active said inching speed switch during the return of the controlling member from the extreme active position into the neutral position.

5. A beamer comprising: an electromotor for rotating a beam to wind the warp thereon, a start switch for an electrical connection with said electromotor, an inching speed switch for an electrical connection with said electromotor, a stop switch for an electrical connection with said electromotor, and movable controlling means for the actuation of said start switch said inching speed switch and said stop switch, said controlling means being normally in a neutral position, said controlling means being adapted to render active said start switch and to render active and subsequently to render inactive said inching speed switch during a movement in one direction from the neutral position, and said controlling means being adapted to render operative said stop switch during a movement in the opposite direction from the neutral position.

6. A beamer comprising: an electromotor for rotating a beam to wind the warp thereon, a start switch for an electrical connection with said electromotor, an inching speed switch for an electrical connection with the electromotor, a stop switch for an electrical connection with said electromotor, a controlling assembly for the actuation of said start switch said inching speed switch and said stop switch, said controlling assembly including movable controlling member, a rotatable actuating cam, a swingable lever, an actuating element pivotally mounted on said lever, stopping means on said lever for limiting the movement of said actuating element in one direction, and a spring associated with said actuating element for urging same against said stopping means, said controlling member being operatively connected with said actuating cam and said lever for a simultaneous movement of these elements, and means associated with said controlling assembly for normally holding the elements thereof in a neutral position, said actuating cam being adapted to render active said start switch during a movement of the controlling member in one direction from the neutral position into a first extreme active position, said actuating element being adapted to render active and subsequently to render inactive said inching speed switch during said movement of the controlling member from the neutral position into said first extreme active position, said actuating element being adapted to yield against the action of its spring without rendering active said inching speed switch during the return of the controlling member from the first extreme active position into the neutral position, and said actuating cam being adapted to render operative said stop switch during a movement of the controlling member in opposite direction from the neutral position into a second extreme active position.

7. A beamer comprising: an electromotor for rotating a beam to wind a warp thereon, a start switch for an electrical connection with said electromotor, a stop switch for an electrical connection with said electromotor, movable controlling means arranged for the actuation of both said start switch and said stop switch, and means associated with said controlling means for selecting one of said actuations by said controlling means.

8. A beamer comprising: an electromotor for rotating a beam to wind a warp thereon, a start switch for an electrical connection with said electromotor, an inching speed switch for an electrical connection with said electromotor, movable controlling means arranged for the actuation of said start switch and said inching speed switch, and actuating means associated with said controlling means for a substantially simultaneous actuation of said start switch and said inching speed switch and for a subsequent release of said inching speed switch alone during a movement of said controlling means for the actuation of said start switch.

9. A beamer comprising: an electromotor for rotating a beam to wind a warp thereon, a start switch for an electrical connection with said electromotor, an inching speed switch for an electrical connection with said electromotor, reciprocable controlling means arranged for the actuation of said start switch and said inching speed switch, said reciprocable controlling means being normally in a neutral position, and actuating means associated with said controlling means for a substantially simultaneous actuation of said start switch and said inching speed switch and for a subsequent release of said inching speed switch alone during a movement of said controlling means from its neutral position into an extreme active position for the actuation of said start switch, said actuating means being of such a shape and construction so as to leave said inching speed switch in its released condition during the return of the controlling means from said extreme active position into said neutral position.

10. In combination with a beamer as claimed in claim 9: resilient means associated with said reciprocable controlling means, said resilient means being arranged for urging said controlling means into said neutral position.

11. A beamer comprising: an electromotor for rotating a beam to wind a warp thereon, a start switch for an electrical connection with said electromotor, an inching speed switch for an electrical connection with said electromotor, and a controlling assembly arranged for the actuation of said start switch and said inching speed switch, said controlling assembly being normally in a neutral position and including a reciprocable controlling member and an actuating member associated with said controlling member, said controlling member being arranged for an actuation of said start switch during a movement of said controlling member from its neutral position into an extreme active position, said actuating member being arranged for an actuation and a subsequent release of said inching speed switch during said movement of said controlling member from said neutral position into said extreme active position, and said actuating member being of such a shape and construction so as to leave said inching speed switch in its released condition during the return of the controlling member from said extreme active position into said neutral position.

12. A beamer comprising: an electromotor for rotating a beam to wind a warp thereon, a start switch for an electrical connection with said electromotor, an inching speed switch for an electrical connection with said electromotor, a stop switch for an electrical connection with said electromotor, movable controlling means arranged for the actuation of said switches, actuating means associated with said controlling means for a substantially simultaneous actuation of said start switch and said inching speed switch and for a subsequent release of said inching speed switch alone during a movement of said controlling means for an actuation of said start switch, and means associated with said controlling means for preventing an actuation of said stop switch during an actuation of said start switch and for preventing an actuation of said start switch during an actuation of said stop switch.

13. A beamer comprising: an electromotor for rotating a beam to wind a warp thereon, a start switch for an electrical connection with said electromotor, an inching speed switch for an electrical connection with said electromotor, a stop switch for an electrical connection with said electromotor, reciprocable controlling means normally in a neutral position, said reciprocable controlling means being arranged for an actuation of said start switch and said inching speed switch during its movement from its neutral position into a first extreme active position and being arranged for an actuation of said stop switch during its movement from its neutral position into a second extreme active position, and actuating means associated with said controlling means for a substantially simultaneous actuation of said start switch and said inching speed switch and for a subsequent release of said inching speed switch alone during a movement of said controlling means for an actuation of said start switch, said actuating means being of such a shape and construction so as to leave said inching speed switch in its released condition during the return of the controlling means from said first extreme active position into said neutral position.

14. In combination with a beamer as claimed in claim 13: resilient means associated with said reciprocable controlling means, said resilient means being arranged for urging said controlling means into said neutral position.

15. A beamer comprising: an electromotor for rotating a beam to wind a warp thereon, a start switch for an electrical connection with said electromotor, an inching speed switch for an electrical connection with said electromotor, a stop switch for an electrical connection with said electromotor, and a controlling assembly arranged for the actuation of said switches, said controlling assembly being normally in a neutral position and including a reciprocable controlling member and an actuating member associated with said controlling member, said controlling member being arranged for an actuation of said start switch during a movement of said controlling member from its neutral position into a first extreme active position, said actuating member being arranged for an actuation and a subsequent release of said inching speed switch during said movement of said controlling member from said neutral position into said first extreme active position, said actuating member being of such a shape and construction so as to leave said inching speed switch in its released condition during the return of the controlling member from said first extreme active position into said neutral position, and said controlling member being arranged for an actuation of said stop switch during a movement of said controlling member from its neutral position into a second extreme active position.

16. A beamer comprising: an electromotor for rotating a beam to wind warp thereon, a start switch for an electrical connection with said electromotor, a stop switch for an electrical connection with said electromotor, movable controlling means for the actuation of both said start switch and said stop switch, said controlling means being arranged for rendering operative said start switch upon a movement in one direction from a neutral position and being arranged for rendering operative said stop switch upon a movement in the opposite direction from the said neutral position, and means associated with said movable controlling means for urging same into the said neutral position.

17. A beamer comprising: an electromotor for rotating a beam to wind warp thereon, a start switch for an electrical connection with said electromotor, a stop switch for an electrical connection with said electromotor, and a controlling assembly for the actuation of said start switch and said stop switch, said assembly including a movable controlling member and actuating means, said controlling member being operatively connected with said actuating means, and said actuating means being arranged for rendering operative said start switch upon a movement of said controlling member in one direction from a neutral position and being arranged for rendering operative said stop switch upon a movement of said controlling member in the opposite direction from the said neutral position.

FRITZ LAMBACH.